United States Patent
Prahst

[11] 3,904,049
[45] Sept. 9, 1975

[54] SELF-UNLOADING VEHICLE WITH TAILGATE OPERATING MECHANISM
[75] Inventor: Eugene D. Prahst, Franklin, Wis.
[73] Assignee: The Heil Co., Milwaukee, Wis.
[22] Filed: May 1, 1974
[21] Appl. No.: 465,961

Related U.S. Application Data
[62] Division of Ser. No. 392,902, Aug. 30, 1973.

[52] U.S. Cl. .............. 214/83.34; 49/254; 296/56; 298/23 S
[51] Int. Cl.² ................. B60P 1/00; B62D 33/00
[58] Field of Search ...... 296/56, 50; 298/22 J, 23 S, 298/23 M, 38; 49/254, 255, 256; 214/83.18, 83.2, 83.22, 83.34

[56] References Cited
UNITED STATES PATENTS

| | | | |
|---|---|---|---|
| 555,969 | 3/1896 | Pierce | 49/254 |
| 2,653,846 | 9/1953 | Wiley | 296/56 |
| 3,757,969 | 9/1973 | Smith | 296/56 |

Primary Examiner—Robert J. Spar
Assistant Examiner—Donald W. Underwood
Attorney, Agent, or Firm—Arthur L. Morsell, Jr.

[57] ABSTRACT

A flexible unloading belt normally covers the floor of a vehicle body such as a trailer body and extends back under a transverse roller at the rear of the trailer body. The belt travels beneath a freely pivoted tailgate which is adapted to be acted on by linkage arms which are rocked by a fluid-powered cylinder to first cause limited vertical movement of the tailgate to unlock the latter and to then cause kicking of the tailgate rearwardly, the gate being further swingable independently of the kicking means in response to pressure from material on the belt.

8 Claims, 6 Drawing Figures

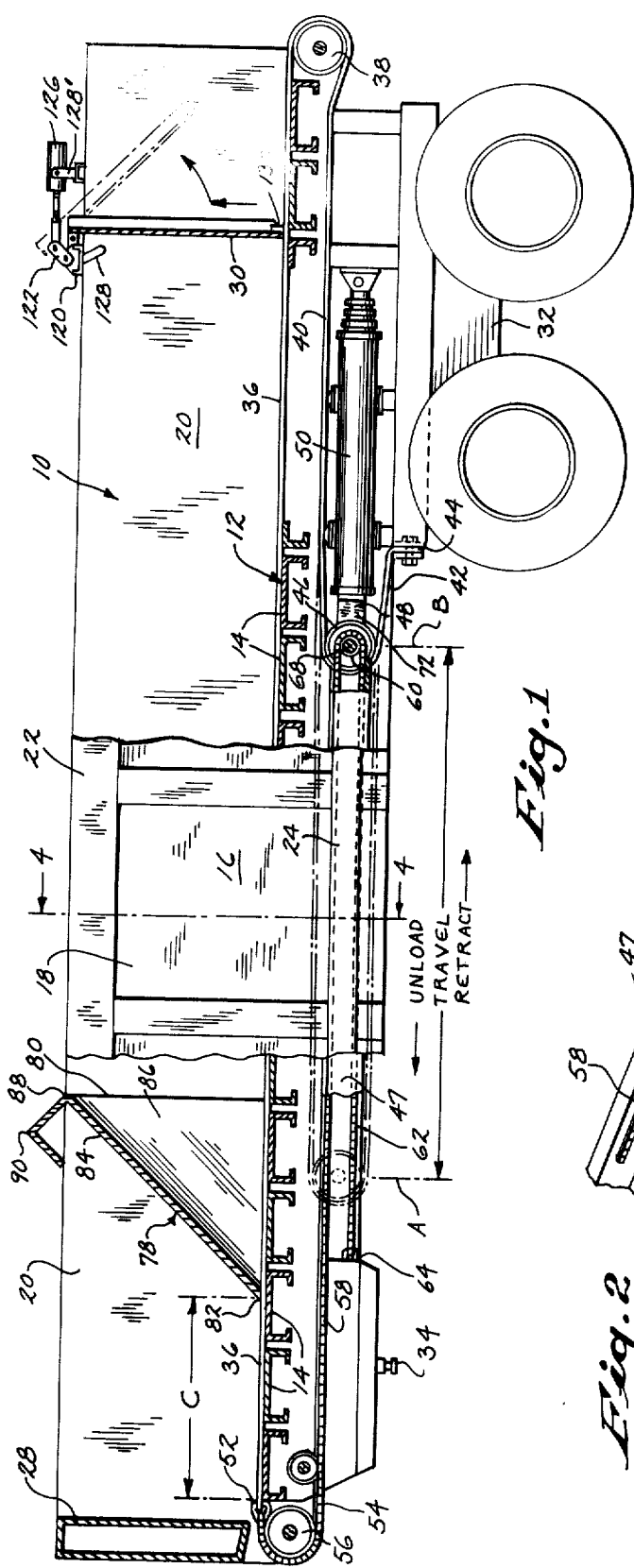
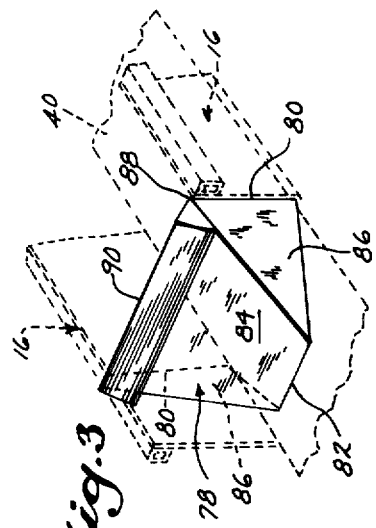
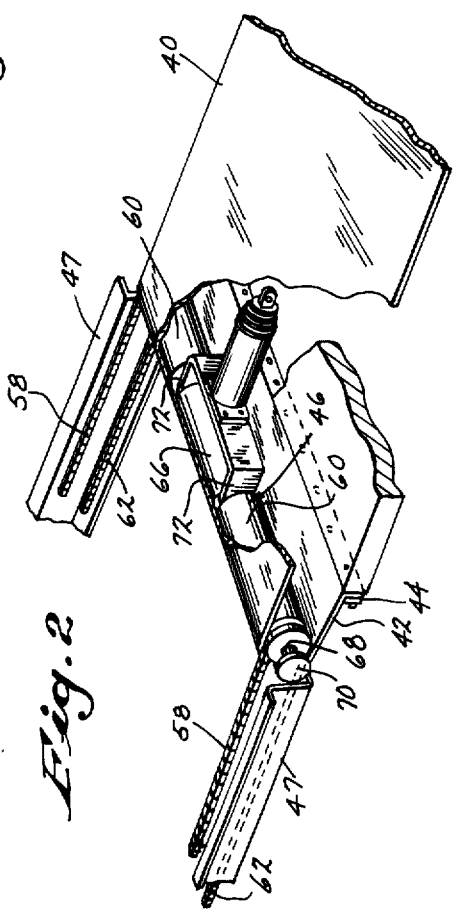
Fig.1
Fig.3
Fig.2

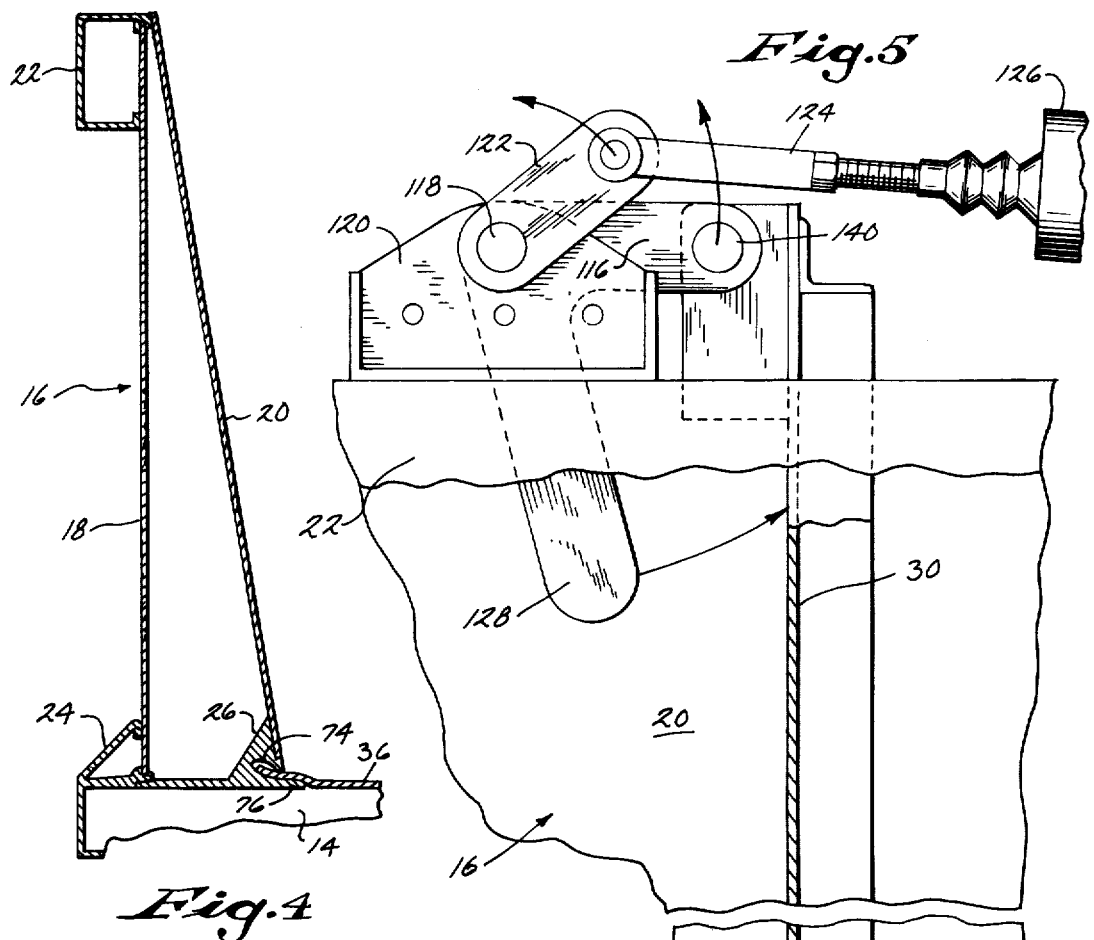
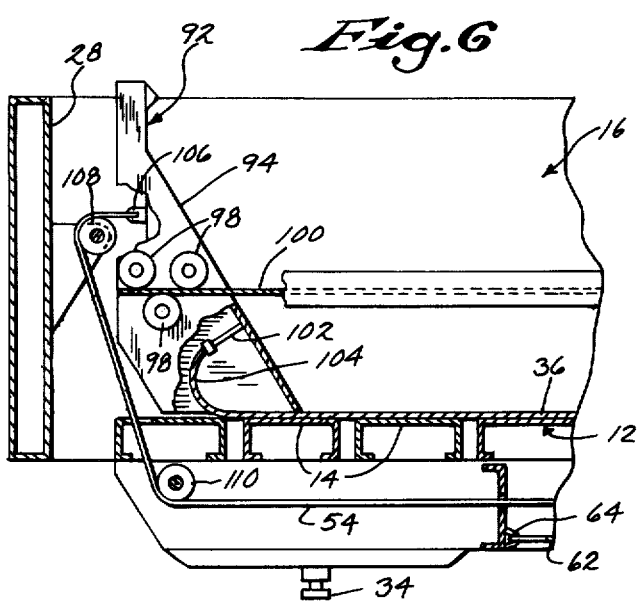

SELF-UNLOADING VEHICLE WITH TAILGATE OPERATING MECHANISM

This is a division of application Ser. No. 392,902, filed Aug. 30, 1973.

BACKGROUND OF THE INVENTION

This invention relates to truck and trailer bodies that are used to carry sand, gravel, stone, asphalt, aggregate, or other loose material that can be discharged from the rear of the vehicle body by a flexible unloading belt that normally covers the bottom of the vehicle body and is movable rearwardly to discharge the material from the body. Such unloading belts have been used in the past, principally in the form of an endless belt whose upper side covers the bottom of the vehicle body and passes underneath the vehicle body over transversely-extending front and rear rollers, one or both of which are motor driven to cause the upper portion of the belt to move rearward when it is desired to unload the vehicle body. Although the principle of unloading a vehicle body with a flexible belt has proved to be workable in practice, difficulties have been experienced with the belt drive systems, e.g. the belt tends to slip on the driven roller when the body is heavily loaded. Furthermore, the requirement to move the belt in two directions has made drive arrangements complicated.

SUMMARY OF THE INVENTION

A flexible belt has an upper portion that normally covers the floor of a vehicle body and a lower portion that extends beneath a transversely-extending roller at the rear of the vehicle body. A lower roller is coupled to a fluid pressure operated ram underneath the vehicle body and is engageable with a looped portion of the flexible belt to exert a pull on the belt when the ram is extended. This moves the upper portion of the belt rearwardly to unload the vehicle body. Cables, operatively engaged around pulleys on the lower roller shaft and around pulleys at the front of the body floor, are connected to the front end of the belt to return the belt to normal position when the ram is retracted. A tailgate is pivotally mounted on the rear of the vehicle body and is preferably under the control of linkage arms which are rocked by a second fluid pressure operated ram. In the principal form of the invention, a stationary bulkhead is arranged in the body a predetermined distance rearwardly of the front end to prevent the load from covering the front portion of the belt whereby said portion is available for fallback during the unloading operation. Said stationary bulkhead, while not essential, provides an important additional feature.

A general object of the invention is to provide an improved unloading means for a vehicle body wherein there is powered means for exerting a pull on the belt to unload the vehicle, with the same means being operable to return the belt to its original position, the novel arrangement eliminating the possibility of slippage which may occur with endless unloading belts or with other conventional arrangements.

A further, more specific object of the invention is to provide an unloading device as above described wherein the unloading belt has a forward end which is normally positioned so that the belt covers the floor of the vehicle, and wherein said forward end is moved by power means to a position near the rear during unloading, there being a novel cabel arrangement attached to the forward end of the belt whereby the same power means may be utilized in a simple arrangement to retract the belt after an unloading operation. As shown in a modification, the belt may carry a movable ejector panel.

A further object of the invention is to provide, in the principal form of the invention where a movable ejector is not used, an arrangement wherein the front end of the belt moves rearwardly to floor-exposing position during an unloading operation, there being a stationary bulkhead arranged within the body, a predetermined distance rearwardly of the front end, which restricts the load to the portion of the belt which is rearwardly of the bulkhead. Thus there is a predetermined amount of belt, at the forward end thereof, which is originally empty and which may accommodate fallback of loose material during unloading.

A further object of the invention is to provide, in a self-unloading vehicle of the class described, a novel tailgate arrangement wherein a normally locked tailgate may be moved to unlocked position and then kicked by power means to a partially open position to permit unloading, the gate, when in unloading position, being freely swingable to provide a discharge opening of greater size when required.

DESCRIPTION OF THE DRAWINGS

FIG. 1 is a partially cut-away side elevational view of a trailer body containing a preferred embodiment of the invention;

FIG. 2 is a fragmentary, partially cut-away, perspective, detail view of the lower roller set which engages a looped portion of the flexible belt underneath the trailer body;

FIG. 3 is a fragmentary, perspective view of the bulkhead at the front of the trailer body as seen from the front, parts of the body being shown by broken lines;

FIG. 4 is a vertical cross-sectional view of one side of the trailer body taken on the line 4—4 of FIG. 1;

FIG. 5 is an enlarged fragmentary elevational view of the tailgate opening apparatus shown in FIG. 1, parts being broken away; and FIG. 6 is a fragmentary view showing a modification with a movable bulkhead which moves rearwardly along with the unloading belt, parts being broken away and shown in section.

DESCRIPTION OF THE PREFERRED EMBODIMENT

Referring to FIG. 1, one embodiment of the invention is installed in a trailer 10 having a bottom 12 made up of spaced transverse slats 14 and having two sides 16 that extend upwardly from the bottom 12. As shown in FIG. 4, each side 16 comprises an outer side panel 18, an inner side panel 20, a side rail 22, and triangular side braces 24 and 26. Referring again to FIG. 1, the trailer 10 also includes a front end 28 which is rigidly attached between the front ends of sides 16, and a tailgate 30 which is pivotally supported between the rear ends of sides 16. The trailer 10 is rollably supported at its rear end by suitable rolling gear 32 and has a fifth wheel pin 34 at its front end for engaging the fifth wheel of a towing vehicle. The invention is applicable to use on vehicles other than trailers.

A flexible belt 36 normally covers the floor of the trailer 10 and extends around and beneath a transversely-extending rear or tail roller 38 which is journalled to the rear of bottom 12. The lower portion of flexible belt 36 has a first lower stretch 40 which extends forwardly underneath the bottom 12 and a second lower stretch 42 which extends rearwardly underneath bottom 12 and is deadended at its rear end 44 to the frame of trailer 10. As best shown in FIG. 2, the belt 36 is preferably engaged beneath bottom 12 by a three-piece drive roller 46 which is rollably supported at its ends by rollers 70 which run on tracks 47, the roller set being moved by a yoke 48. The three-piece roller 46 engages the looped portion of the belt 36 between the forwardly-extending stretch 40 thereof and the rearwardly-extending stretch 42. The yoke 48 which moves roller 46 is carried by one end of a fluid pressure operated ram 50 such as a ram formed by double acting telescopic hydraulic cylinders as shown, which cylinders are attached at their other end to the frame of trailer 10. Conventional means, not shown, is provided for selectively extending and retracting the ram 50 over a range of travel between lines A and B of FIG. 1. As an alternative, two single-acting rams may be used, one on each side of the rollers 46.

The front end of flexible belt 36 is attached at 52 to two cables 54 which pass over front pulleys or rollers 56, journalled toi the front of trailer bottom 12, and which cables then extend rearwardly underneath bottom 12 as in stretch 58, then pass around pulleys 60 on the ends of rollers 46, then extend forwardly underneath bottom 12 as in stretch 62, and finally are deadened at 64 to the frame of trailer 10.

In the operation of this embodiment, the truck is unloaded by causing the ram 50 to extend toward the line A in FIG. 1. This moves the looped portion of the flexible belt forwardly underneath floor 12 and moves the top of the belt rearwardly on top of floor 12 to carry the load rearwardly. The tailgate 30 is opened as indicated by the dashed lines in FIG. 1 by means described hereinafter to permit the loaded belt 36 to pass beneath tailgate 30. As the belt passes around the rear roller 38, the material on the belt is discharged and falls to the ground. The trailer 10 may be moved forwardly as it is being unloaded to spread its load on the ground. As the belt 36 is moved rearwardly, the cables 54 are pulled rearwardly by the same amount due to their attachment to belt 36. When the unloading has been completed, the two-way ram 50 is retracted back to the position shown by the solid lines in FIG. 1. This retraction pulls the cables 54 rearwardly under bottom 12, and exerts a forward pull on the upper stretch of belt 36 to return the belt 36 to its original position covering the bottom 12.

It should be noted that there is no possibility of the belt 36 slipping on the roller 46 as it is being moved forwardly by ram 509 to unload the vehicle. In prior art arrangements, one or more of the rollers over which the flexible belt passes have been driven, but this allowed the belt to slip on the rollers. In the structure of the present invention, the possibility of slippage is eliminated by a positive drive arrangement which cannot slip no matter how heavy the load. The unloading drive of this invention will work under any encountered load conditions. It should also be noted that the particular arrangement causes the belt 36 to move approximately twice as far as the drive rollers 46, which allows the belt drive mechanism of this invention to be conveniently located beneath bottom 12. Cables 54 also move twice as far as the drive rollers 46 due to the reeving arrangement.

Although any suitable roller means may be attached to the ram 50 to move the flexible belt 36 back and forth below bottom 12, the particular three-piece construction shown in FIG. 2 is preferable because it minimizes deflection of the roller 46 due to pressure from the belt 36 or ram 50. Drive roller set 46 is made of three roller sections 66 of approximately equal length which are journalled to a common shaft 68. The shaft 68 has end wheels 70 which roll in the tracks 47. This provides support for both ends of the shaft 68. The yoke 48 which couples the ram 50 to the drive roller set 46 has two parallel arms 72 through which the shaft 68 is journalled. The force which is applied from ram 50 to rollers to the shaft 68 via the spaced yoke arms 72. This practically eliminates deflection of the center roller section 66 and minimizes deflection of the outer roller sections.

As shown in FIG. 4, the bottoms of the hollow side panels are each closed by an extrusion 26, preferably of aluminum. Each extrusion is longitudinally slotted at 74 to slideably receive the side edge of flexible belt 36. A bottom lip 76 extends inwardly from the bottom of the slot 74 under the edge of belt 36. In use, the loaded material in the trailer body presses the edges of belt 36 down on the lips 76 and thus acts as an edge seal for the belt 36 to prevent material, such as gravel, from working under the side edges of the belt 36. The loaded material may be sand, gravel, stone, asphalt, aggregate, or other loose material that can be dischargedfrom the rear of the trailer 10 by the flexible belt 36. The flexible belt 36 may be made of a suitable heavy fabric which is covered by neoprene, rubber, or other coating.

Referring to FIGS. 1 and 3, a tapering metal bulkhead 78 is positioned within the forward portion of trailer 10 to extend transversely. The bulkhead 78 is attached at its side edges 80 to the sides 16 of trailer 10, and is spaced above the flexible belt 36 to allow the belt 36 to move freely underneath the bulkhead 78. The rear end 82 of bulkhead 78 is spaced by a distance C from the front end of belt 36 to provide an unloaded forward portion of the belt 36. This is adapted to accommodate spillback at the front end of the load as the belt 36 is being moved rearwardly to discharge the load. The bulkhead 78 contains a sloping back panel 84 and two converging side panels 86 which are preferably formed by bending aa piece of sheet metal along the appropriate bend lines. The backward slope of back panel 84 and converging of side panels 86 provides a shaped enclosure for overflow from the front portion of the load in the trailer 10. The uppermost edge of back panel 84 is stiffened and protected from spillover by being bent on lines 88 and 90 as best shown in FIG. 1.

In the event that any poirtion of the load should spill over the forward end of belt 36 during the unloading movement, such spillage would fall through the spaces between slats 14 immediately or would be knocked into these spaces when the belkt 36 is moved back to its original position. Thus the spaces between slats 14 makes the bottom 12 self-cleaning in combination with the movable belt 36.

In the modification of FIG. 6, a movable bulkhead is used in place of the fixed bulkhead described above. A suitable type of movable bulkhead 92 is illustrated in FIG. 6. In this construction, the movable bulkhead 92 has a flat, rearwardly-sloping wall 94 and two side walls 96 which are rigidly attached to end wall 94 and are integral therewith. Three rollers 98 are journalled to each side wall 96, and are positioned to rollably engage an adjacent flat rail 100 which projects inwardly from the adjacent side 16 and extends along the full length of the trailer. The movable bulkhead 92 is rollably supported upon the rails 100 by the rollers 98 for its full length of travel along the trailer body.

The forward end of flexible belt 36 is rigidly attached to bulkhead 92 at 102, the end of flexible belt 36 being preferably bent around in a curve as at 104 immediately adjacent the fastened edge 102. When the belt 36 is pulled rearwardly by ram 50, it pulls the bulkhead 92 rearwardly along the rails 100. As the bulkhead 92 and load are moved rearwardly by belt 36, the bulkhead 92 prevents spillback from the front portion of the load. When the load is completely ejected, the bulkhead 92 is pulled back to its forward position by cables 54 which are attached to the frnt of bulkhead 92 at 106 and are guided thereto around pulleys 108 and 110. Since the movable bulkhead 92 prevents spillback, it can be mounted immediately adjacent the front 28 of trailer 10 instead of being spaced by a distance C such as used for the fixed bulkhead 78 of the form of the invention of FIG. 1.

FIGS. 1 and 5 illustrate the construction of a tailgate and tailgate opening mechanism which are particularly adapted for use with the self-unloading trailer of this invention. Referring to FIG. 5, the tailgate 30 is freely pivoted on shaft 140, and the latter has bell crank portions 116 pivoted thereon, only one of which is shown in the drawings. The bell cranks are rigidly attached, at their knees, to a rock shaft 118 which extends across the top of the trailer body and is journalled in a pair of supporting brackets 120, one of which is attached to the top of each side rail 22. An actuating arm 122 is rigidly attached at one end to one end of shaft 118 and is pivotally connected at the other end to the piston rod 124 of a hydraulic or pneumatic ram 126 which is mounted on top of one of the side rails 22 by a suitable bracket 128' (see FIG. 1). Conventional means, not shown, is provided for causing extension and retraction of the ram 126 under the control of a suitable switch or valve. The lowermost arms 128 of the bell cranks are angled rearwardly at a relatively small angle to act as kicker arms for moving the tailgate 114 rearwardly as explained hereinafter.

When the tailgate 30 is in its closed position, shown in solid lines in FIGS. 1 and 5, its lower edge is normally latched in front of a pair of blocks 130 which are welded to the bottom of inner side panels 20. When the ram 126 is actuated to open the tailgate, it moves link 122 counterclockwise in FIG. 5, as indicated by the arrow. This rock shaft 118 counterclockwise, which carries bell cranks 116 counterclockwise along with their kicker arms 128 as indicated by the arrows in FIG. 5. The upper arms of bell cranks 116 first raise the tailgate 30 clear of the blocks 130, and the kicker arms 128 then tilt the tailgate 30 rearwardly as indicated by the broken lines in FIG. 1. When the flexible belt 36 is removed rearwardly to discharge the load, the load presses against the bottom of the tilted tailgate 30 and causes it to pivot further in a counterclockwise direction about its loose pivot on the shaft 140 to let the load pass under the tailgate 30.

After the trailer body has been completely unloaded, the tailgate can be closed by causing the ram 126 to retract, which rotates shaft 118, bell cranks 116, and their kicker arms 128 clockwise in FIG. 5, thereby dropping the bottom of tailgate 30 back into position in front of blocks 130 as indicated by the solid lines in FIG. 1.

What I claim is:

1. In a vehicle body having a floor and side walls extending upwardly from said floor, and having a transversely-extending tailgate, tailgate opening mechanism comprising a shaft journalled between said side walls adjacent to the upper edge of said tailgate, bell cranks each having an intermediate portion rigidly connected to said shaft and having first and second arms, the upper edge of said tailgate being loosely pivoted to said first arms, and said second arms being positioned to kick the tailgate, and means for rocking said shaft to cause said first arms to raise said tailgate and to cause said second arms to kick said tailgate toward open position.

2. A vehicle body as claimed in claim 1 in which an unloading belt is movably mounted to extend beneath said tailgate and in which the loose pivoting of the tailgate permits additional opening movement as required by the load on the belt.

3. A vehicle body as claimed in claim 1 in which there is means normally locking the tailgate against opening movement and in which the means for raising the tailgate causes disengagement from said locking means.

4. In a vehicle body having a floor and side walls extending upwardly from said floor and having a transversely-extending tailgate, means between said side walls and the upper portion of the tailgate supporting the latter for rearward swinging movement and for vertical movement, stop means on the vehicle body engaged by the tailgate when the latter is closed and positioned to normally prevent said rearward swinging movement, tailgate operating mechanism connected to the side walls of the vehicle, and means between said operating mechanism and tailgate for first moving the tailgate vertically to free the latter from said stop means and for thereafter swinging the tailgate rearwardly, said means supporting the tailgate for rearward swinging movement and for vertical movement comprising arm means mounted for swinging movement in a vertical plane, which arm means are parts of pivoted bell cranks, and at least one of said bell cranks having another arm which is positioned to engage the tailgate to cause said rearward swinging movement.

5. In a vehicle body having a floor and side walls extending upwardly from said floor and having a transversely-extending tailgate, means between said side walls and the upper portion of the tailgate supporting the latter for rearward swinging movement and for vertical movement and including a pivotal connection on which the gate is freely swingable, stop means on the vehicle body engaged by the tailgate when the latter is closed and positioned to normally prevent said rearward swinging movement, means for causing vertical movement of the tailgate to free the latter from said stop means, and means for thereafter kicking the tailgate rearwardly, said kicking means being free of connection with the tailgate to allow further swinging movement of the tailgate on its pivotal connection independently of said kicking means.

6. A vehicle body as claimed in claim 5 in which said kicking means includes a swingable arm pivoted to the body and connected to said means for causing vertical movement of the tailgate to be responsive to movement of the latter.

7. A vehicle body as claimed in claim 3 in which an unloading belt is movably mounted to extend beneath said tailgate, and in which the loose pivoting of the tailgate permits additional opening movement as required by the load on the belt.

8. In a vehicle body having a floor and side walls extending upwardly from said floor, and having a transversely-extending tailgate, tailgate operating mechanism including bell cranks pivotally mounted on the body and having first arms, the upper edge of said tailgate being loosely pivoted on said first arms, and at least one of said bell cranks having a second arm positioned to kick the tailgate, and means for causing rocking of said bell cranks to cause said first arms to raise said tailgate and to cause said second arm to kick said tailgate toward open position.

* * * * *